(12) United States Patent
Kerman

(10) Patent No.: US 10,927,200 B2
(45) Date of Patent: Feb. 23, 2021

(54) METHOD FOR PREPARING A DRY-STRENGTH AGENT, IN PARTICULAR GLYOXYLATED POLYACRYLAMIDE

(71) Applicant: Applied Chemicals Handels-GmbH, Vienna (AT)

(72) Inventor: Nuri Kerman, Darmstadt (DE)

(73) Assignee: APPLIED CHEMICALS HANDELS-GMBH, Vienna (AT)

(*) Notice: Subject to any disclaimer, the term of this patent is extended or adjusted under 35 U.S.C. 154(b) by 48 days.

(21) Appl. No.: 15/443,166

(22) Filed: Feb. 27, 2017

(65) Prior Publication Data
US 2017/0306065 A1    Oct. 26, 2017

(30) Foreign Application Priority Data
Apr. 25, 2016 (AT) ................ A 212/2016

(51) Int. Cl.
| | | |
|---|---|---|
| *C08F 120/56* | (2006.01) | |
| *D21H 17/37* | (2006.01) | |
| *C08F 8/28* | (2006.01) | |
| *D21H 17/38* | (2006.01) | |
| *D21H 21/18* | (2006.01) | |

(52) U.S. Cl.
CPC .............. *C08F 120/56* (2013.01); *C08F 8/28* (2013.01); *D21H 17/375* (2013.01); *D21H 17/38* (2013.01); *D21H 21/18* (2013.01)

(58) Field of Classification Search
CPC ................................... C08F 120/56
USPC ............................................. 525/51
See application file for complete search history.

(56) References Cited

U.S. PATENT DOCUMENTS

| | | | |
|---|---|---|---|
| 7,875,676 B2 | 1/2011 | Wright | |
| 2009/0126890 A1* | 5/2009 | Wright | D21H 21/18 162/164.6 |
| 2015/0322171 A1* | 11/2015 | Tienvieri | D21C 9/00 428/401 |
| 2017/0349670 A1* | 12/2017 | Kajanto | C08B 15/04 |

FOREIGN PATENT DOCUMENTS

WO    2009/059725 A2    5/2009

* cited by examiner

*Primary Examiner* — Hui H Chin
(74) *Attorney, Agent, or Firm* — Jacobson Holman PLLC

(57) ABSTRACT

In a method for preparing glyoxylated polyacrylamide, in which an aqueous solution of polyacrylamide is supplemented with ethanedial (glyoxal) under stirring by means of a circulation pump, the reaction is started by the addition of a base, at a basic pH value above 8, and is allowed to react under stirring and/or circulating, whereupon the reaction is stopped by the addition of an acid under stirring and/or circulating after completion of a predetermined reaction time, wherein the method is per as a discontinuous method in which the quantitative reaction of ethanedial with an excess amount of polyacrylamide in an aqueous basic medium is controlled and/or regulated by at least one, of the following factors: a) turbidity measurement b) adaptation as a function of the temperature c) pH adaptation as a function of the reaction time d) drop of pH the value, or e) current consumption of the circulation pump.

8 Claims, 2 Drawing Sheets

METHOD FOR PREPARING A DRY-STRENGTH AGENT, IN PARTICULAR GLYOXYLATED POLYACRYLAMIDE

BACKGROUND OF THE INVENTION

The present invention relates to a method for preparing a dry-strength agent, in particular glyoxylated polyacrylamide, in which an aqueous solution of polyacrylamide is supplemented with ethanedial (glyoxal) under stirring by means of a circulation pump, the reaction is started by the addition of a base, in particular a strong base, at a basic pH value, in particular a pH value above 8, and is allowed to react under stirring and/or circulating, whereupon the reaction is stopped by the addition of an acid under stirring and/or circulating after completion of a predetermined reaction time.

Methods for preparing dry-strength agents for the paper industry are known, most of said methods operating continuously. In such methods, a substantially aqueous reaction mixture of a vinylamide polymer and a reactive cellulose agent is usually allowed to react for a predetermined period of time at a basic pH value, wherein a plurality of factors such as the temperature of the entering water, the pH value of the reaction mixture, the consumption of the reactive cellulose material, the concentration of the vinylamide polymer are measured before and during the formation of the adduct and the like, in order to enable the reaction to be stopped in time when the desired adduct has formed. In order to be able to stop the reaction in time, viscosity measurements for determining the extent of reaction, in particular, have already been performed in addition to a multitude of different measurements. Most of the known methods result in products that are not prepared in situ, but are transported to the ultimate consumer by tank trucks and there are diluted to the concentration required for the reaction, e.g. 3 to 4%. Those known methods involve the drawback that huge amounts of liquids have to be transported and, apart from that, the products will suffer during transport despite added stabilizers and have reduced overall storage or shelf lives.

Thus, U.S. Pat. No. 7,875,676 describes a method for preparing a cellulose reactive polyvinylamide adduct, in which an aqueous reaction mixture of a vinylamide polymer and a cellulose reactive agent are continuously reacted, while measuring the viscosity during the reaction. When the viscosity is no more than 30 cP at a temperature of 25° C., the reaction is stopped. Such methods in which the viscosity of adducts is measured involve problems to the effect that, if the moment for stopping the reaction is overlooked, i.e. the viscosity increases too much, a water-insoluble gel is formed, which cannot be used as a dry-strength agent. Such glyoxylated adducts, moreover, contain significant amounts of organic materials and/or solvents such as organic oils, which are not only costly but also highly volatile, thus limiting the use of such adducts.

From WO 2009/059725, glyoxylated N-vinylamines can be taken, in which a mixture of acrylamide and diallyldimethylammonium chloride is glyoxylated, wherein the reaction is exclusively monitored by turbidity measurement such that an exact end, or an exact statement as to when a quantitative reaction has occurred, does not seem possible.

Commercially available glyoxylated polyvinylamide adducts, moreover, suffer from the drawback of having a very short shelf life of just a few weeks, said shelf life being a function of the pH value, the concentration and the storage temperature, thus involving problems in practical use, since it always has to be safeguarded that freshly delivered or freshly available adduct is provided.

In order to operate economically, at least to some extent, in such a procedure, products having vinylamide polymer concentrations too high for such use are supplied, and thus have to be diluted prior to their actual use in order to enable a reasonable reaction.

Finally, in most of the known methods, a high amount of unreacted glyoxal will remain in the product after having reached the desired viscosity, thus involving the disadvantage that such a product cannot be used as a dry-strength agent.

The application of glyoxylated polyacrylamide as dry-strength agent for strengthening paper and cardboard, and of reactive water-soluble vinylamide cellulose copolymers modified with glyoxal or reactive cellulose agents so as to be thermosetting is applied for strengthening paper and cardboard. Due to the use of glyoxal as cross-linking agent, those products, however, involve problems relating to the stability and storage of such suspensions, which have shelf lives approximately ranging between 3 and 6 weeks due to their reduced stability.

BRIEF SUMMARY OF THE INVENTION

The invention aims to provide a method for preparing a dry-strength agent, by which it is possible to react glyoxal quantitatively in the reaction mixture and thus provide a dry-strength agent with an extended storage stability, which can be used universally and, in particular, immediately after its preparation. The invention further aims to provide a method for preparing a dry-strength agent, which can be controlled in such a precise manner that the quantitative reaction of glyoxal can be ascertained in the reaction mixture without doubt.

To solve this object, the method according to the invention is essentially characterized in that the method is performed as a discontinuous method in which the quantitative reaction of ethanedial with an excess amount of polyacrylamide in an aqueous basic medium is controlled and/or regulated by at least one, preferably at least two, of the following factors:
  a) turbidity measurement
  b) pH adaptation as a function of the temperature
  c) pH adaptation as a function of the reaction time
  d) drop of the pH value, or
  e) current consumption of the circulation pump.

In that the method is performed as a discontinuous method, the quantitative reaction of ethanedial with an excess amount of polyacrylamide in an aqueous basic medium can be controlled or regulated as a function of a plurality of factors in any batch. In that, at the same time, at least two of these factors are measured during the reaction, it has become possible to prepare a reproducible, or precisely reproducible, product with any batch.

The individual factors, two of which are each simultaneously used as control or regulation quantities, are as follows:
  a) Turbidity Measurement It turned out that a change in the turbidity was an indicator for the degree of conversion of the reaction, the reaction mixture having an initial turbidity usually ranging from 5 to 15 NTU. When the turbidity has risen by a defined value during the reaction, this is an indicator that the desired degree of conversion has been reached and any further reaction can be prevented by the addition of an acid. Unless the reaction is stopped by the addition of an acid, the turbidity will increase further. The turbidity measurement is preferably performed as a difference measurement so that the value of the initial turbidity does not enter into the measurement, thus always obtaining an unambiguous result.

b) pH Adaptation Via the Temperature

It should basically be noted in the context of the reaction of polyacrylamide with ethanedial that the reaction always takes place when the solution has a basic pH value. The reaction time will then change as a function of the pH value, which would require a relatively sophisticated control or regulation of the plant. Surprisingly, it has, however, been found that the reaction time remains substantially constant, or can be preset, and that reaction times between 12 and 18 minutes constitute the optimum time between reaction times that are too long and in which the capacity of the plant would strongly decrease, and reaction times that are too short and in which increased deposits on the vessel wall and in the piping of the plant would be observed.

For this reason, the temperature is another key factor besides the pH in the control of the reaction rate. Since, in practice, it is, however, hardly possible to keep the temperature of a reaction mixture always constant, the pH adaptation according to the invention is effected via the temperature, i.e. a temperature correction factor is input, based on which the pH value is automatically reduced or increased from a defined value per degree of temperature difference. The set value may, for instance, be 20° C.

c) pH Adaptation Via the Reaction Time

It is also possible to correct the pH value via the reaction time. In this case, it is substantially proceeded such that a pH is adjusted by which the pH set value is corrected in the case of a time deviation, until the quantitative completion of the reaction is obtained. Moreover, a minimum pH is determined by which the pH set value is allowed to be reduced in the case of several consecutively occurring time deviations, and similarly a maximum pH is determined to which the pH set value may be increased in the case of several consecutive time deviations. The pH correction according to the invention will only be effected after a previously defined number of higher or lower deviations so as to obviate the requirement of an immediate correction at each deviation. Thus, if the desired reaction time in a batch is exceeded or not reached by a defined value, wherein also here a dead range can be defined, i.e. a range that will not enter into the measurement, the deviating reaction time will be stored, and if the same deviation occurs in the following batch, a correction will automatically be made.

d) Drop of the pH Value

In the reaction of glyoxylated polyacrylamide with ethanedial, a drop of the pH value is measured during the reaction. The reaction can, therefore, also be controlled or regulated to the effect that, if such a drop of the pH value is observed, the reaction will be stopped, since it will then likewise have been quantitatively completed.

e) Current Consumption or the Circulation Pump

It is finally possible to control or regulate the reaction via the current consumption of the circulation pump, which is integrated in a plant in which the reaction according to the invention is performed. In this case, the circulation pump commands a steadily rising current consumption during the reaction, which will abruptly adjust at a constant value that will no longer rise at the end of the quantitative reaction, thus indicating the end of the reaction. The current consumption of the circulation pump, which is indicated and optionally also recorded, can thus also be used to control the method.

According to the invention, at least two of these parameters are measured or determined in order to have a safe indication on the reaction end, i.e. on the quantitative reaction of ethanedial or glyoxal with polyacrylamide. Such a process management in a surprising manner enables the preparation from polyacrylamide and glyoxal of an adduct that has a significantly increased storage stability over conventional adducts at a simultaneously reduced water content, which may be ascribed to missing residual amounts of unreacted glyoxal.

A particularly reliable process management and, above all, quantitative reaction of ethanedial according to the invention will be ensured if, as in correspondence with a further development of the invention, polyacrylamide and ethanedial are used at a quantitative ratio of 3:1 to 10:1, in particular 5:1 to 6:1.

In particular, where the drop of the pH value is used as one of the control or regulation quantities for determining the end of a reaction, the method, as in correspondence with a further development of the invention, is conducted such that the reaction of polyacrylamide and ethanedial is stopped by the addition of an acid, by lowering the pH of the reaction mixture to a value between 2 and 6, in particular between 3.5 and 4.5. In doing so, the reaction is stopped by the addition of an acid, and the pH of the system is lowered to values ranging between 2 and 6, in particular between 3.5 and 4.5, as soon as a pH drop of about 0.3 is observed. As said acid, any acid selected from sulfuric acid, sulfurous acid, hydrochloric acid, hydrofluoric acid, acetic acid, citric acid, phosphoric acid, adipic acid and oxalic acid may be added.

Where the turbidity measurement and/or the drop of the pH value are used as control or regulation quantities in the control of the method according to the invention, the method according to the invention is conducted such that an acidification is effected after the onset of a pH drop of the reaction mixture by a value of at least 0.1 to about 1, in particular 0.3, and/or after an increase in the turbidity of the reaction mixture by 4 to 10 NTU, in particular 6 NTU. In particular where both factors, i.e. the drop of the pH value and the increase in turbidity, are taken into consideration, it is possible to exactly determine the end of the reaction and stop the reaction by the addition of an acid immediately after the achievement of the quantitative reaction of polyacrylamide with ethanedial.

According to a further development of the invention, when the adaptation of the pH value is effected via the temperature, it is proceeded such that, based on a temperature of 25° C. of the reaction mixture, the pH value is lowered at an increasing temperature of the reaction mixture, and raised at a decreasing temperature, according to the formula pH start=basis pH+[(temp start−20° C.)·F], wherein basis pH constitutes a preselected value, pH start results from the reaction and constitutes the initial value for the next reaction, temp start represents the temperature at the beginning of the reaction, and F is a multiplier between 0.03 and 0.08. Since the reaction temperature cannot be kept constant 100% over time, such a mode of operation will prevent the immediate initiation of a regulation of the method each time a slight deviation of the temperature occurs, but such a method management will rather enable an adjustment of the pH set value of the reaction mixture with very small deviations by selecting a temperature correction factor as described above.

As in correspondence with a preferred further development of such a method management, it is proceeded such that an increase or decrease of the pH value is performed using a temperature correction factor of between 0.03 and 0.08, in particular 0.05. In this respect, it may, for instance, be proceeded such that, based on a pregiven temperature of e.g. 20° C., the pH is automatically increased or decreased, respectively, by an adjustable, previously defined and then no longer changeable value per degree of temperature difference, such a correction factor being selected between 0.03 and 0.08, in particular at 0.05. According to the invention, it is finally also possible to preselect different temperature correction factors as a function of the respective reaction temperatures, for instance a temperature correction factor COLD, which is freely adjustable, since the reaction temperatures of 10° C. at COLD will require a higher increase in the pH value to keep the reaction time constant, a temperature correction WARM, which is also freely adjustable, for instance to keep the pH as low as possible at high reaction temperatures such as 30° C., and finally a temperature correction factor NORMAL, which is the factor chosen at the normally preselected reaction temperature. Such preadjustment in most cases takes place as a function of the season or climate zone in which the plant is installed, since the temperature in a workshop is usually strongly influenced by the respectively prevailing external temperature. In order to enable as high a utilization of the reaction plant as possible, the method according to the invention is further developed to the effect that the reaction of polyacrylamide with ethanedial is performed over a predetermined constant time of between 2 and 30 minutes, preferably 6 to 20 minutes, in particular 12 to 18 minutes. The predetermined constant time of between a maximum of 32 minutes and a minimum of 6 minutes, and preferably between 12 and 18 minutes, will each enable the achievement of a complete reaction of polyacrylamide and glyoxal at usually prevailing temperatures. The time differences in this case depend on whether the reaction is performed at higher or lower external temperatures, which also have some influence on the temperature in the production hall, and/or at higher or lower water temperatures.

If, in particular, reaction control is performed via pH adaptation as a function of the reaction time, the method according to the invention is further developed to the effect that, at a fixed constant reaction time, a pH adaptation by 0.1 to 1.0, in particular 0.2 to 0.4, is effected after an at least one-time detection of a deviation of between 1 and 10 minutes, in particular 2 to 4 minutes, from the fixed reaction time. By such a mode of operation, it will be avoided that a pH adaptation will be made no matter how low the deviation of the reaction time from the fixed reaction time is until the completion of the reaction, but it will be ensured that the actual deviation from the fixed time will be measured before an adaptation of the pH value will be effected, thus enabling a shift of the reaction time back towards the fixed reaction time.

A particularly elegant option to control the method for preparing a dry-strength agent by reacting polyacrylamide with glyoxal is achieved in that, as in correspondence with a further development of the invention, the lowering of the pH value of the reaction mixture is performed by the aid of an acid when reaching a constant current consumption ranging from 0.1 A to 1 A, in particular 0.2 A to 0.6 A, of the circulation pump. Such a method management allows the undoubted recognition of the moment at which the current consumption of the circulation pump reaches a constant value, whereupon, immediately after this moment, an acid is added to stop the reaction. Such a control thus enables the reaction to be quantitatively conducted.

Particularly reliable results from the control of the method for preparing a dry-strength agent, which is obtained by the reaction of polyacrylamide with glyoxal, according to the invention will be achieved in that the method is conducted such that the control and/or regulation of the method is performed by observing a combination of factors a) and b); a), b) and c); a) and d); a), b), c) and d); a), d) and e); b) and d); b) and e); b), c) and d); or b), d) and e).

BRIEF DESCRIPTION OF THE DRAWINGS

In the following, the invention will be explained in more detail by way of an exemplary embodiment and the schematic process control diagram illustrated in the Figure. Therein.

DETAILED DESCRIPTION OF THE INVENTION

Figure 1:
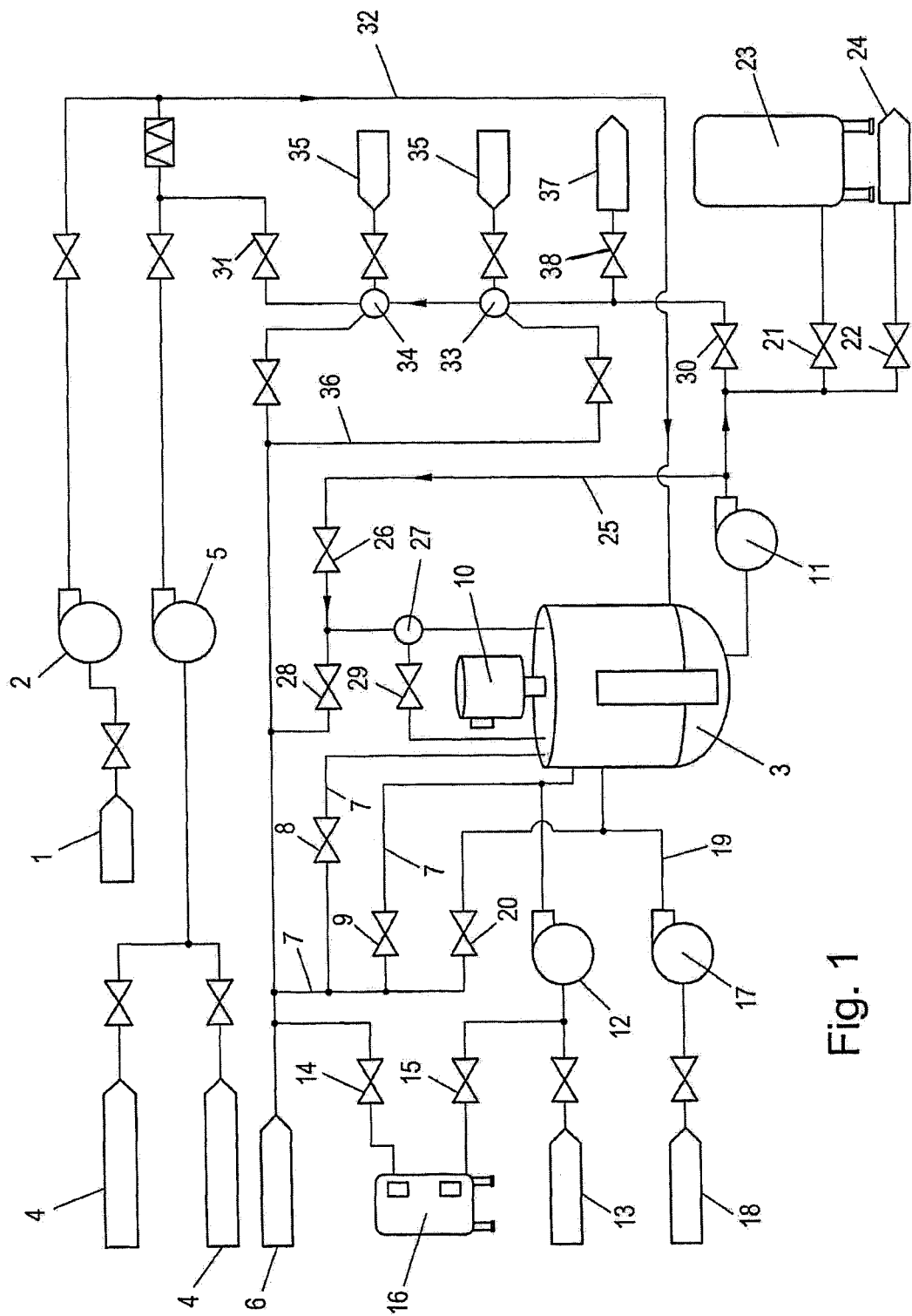
FIG. 1 depicts the structure of a device for carrying out the method for preparing a dry-strength agent according to the invention.

FIG. 1 schematically depicts the sequence of the method for preparing a dry-strength agent comprising glyoxilated polyacrylamide, in which an aqueous solution of polyacrylamide is reacted with ethanedial (glyoxal) in a batch reactor. In doing so, glyoxal from a storage tank 1 is fed via a metering pump 2 and a plurality of valves into a reactor 3. At the same time, polyacrylamide is fed into the reactor 3 from at least one tank vessel 4, yet preferably two independently controllable tank vessels 4, via a metering pump 5 and also a plurality of control or regulating valves not described in detail. In addition to glyoxal and polyacrylamide, feed water from a fresh water tank 6 is introduced into the reactor 3 via a line 7 and opened valves 8, 9, in particular prior to the reactant or simultaneously therewith. The feeding of water, glyoxal and polyacrylamide takes place either in this order or simultaneously, wherein the metering pumps 2 and 5 are activated at the same time and programmed to dispense the desired molar ratio of glyoxal and polyacrylamide. Simultaneously with the activation of the metering pumps 2 and 5, a stirrer 10 provided in the reactor 3 is turned on, as is the schematically illustrated circulation pump 11, which also contributes at least partially to the blending of the reactants. After the desired quantities of glyoxal and polyacrylamide solution have been admixed to the water, the feed pumps 2 and 5 are turned off, the valves 8 and 9 are closed, and the feeding of the reactants is stopped. While the addition of the reactants is stopped, the admixture of lye, e.g. soda lye, from an alkali tank 13 via an alkali pump 12 is simultaneously started until the desired pH of the reaction, e.g. pH 9, is reached. In order to be able to precisely adjust the alkali concentration and, in particular, the pH value, valves 14 and 15 are opened besides the activation of the feed pump 12 for the lye, said valves controlling or regulating the feeding of water, e.g. either fresh water from the fresh water tank 6 or partially also flush water from the flush water tank 16, to the concentrated lye such that the metering into the reactor 3 of lye diluted to such an extent as to enable the precise adjustment of the desired pH value is possible. When lye metering is started and, in particular, when a basic pH, e.g. 9, is reached, the reaction of the reactants in the reactor 3 begins, with the following factors being continuously recorded: the temperature of the reaction mixture, the turbidity of the reaction mixture, its pH and the current consumption of the circulation pump 11. When reaching at least one of the following parameters, i.e. when reaching a predefined turbidity value, when reaching a constant current consumption of the circulation pump, or when reaching a predefined drop of the pH value, the reaction is stopped by turning on the acid pump 17, and hence by the addition of acid, e.g. sulfuric acid, from an acid reservoir 18 into the reactor 3. To adjust the respective concentration of the acid to be metered in, fresh water from the fresh water tank 6 is again fed into the acid feed line 19 to the reactor 3 by opening valve 20. At the time of the dispensing of the acid, valves 8, 9 for charging fresh water to the reactor for adjusting the initial concentration of the reactants and valves 14, 15 intended to adjust the concentration of the lye are closed. The respective valves that render the respective, individual storage tanks separable from their metering pumps and lines are also closed, wherein, for the sake of simplicity, control or regulating valves illustrated in FIG. 1 are not described in detail here, their functioning being self-explanatory. When reaching a pH of about 3 to 4, the acid pump 17 is turned off again, and the circulation pump 11 remains active, wherein valve 21, and optionally valve 22, are additionally opened to discharge the product into a storage tank 23, and to also immediately discharge, at 24, possibly present amounts of waste. From the storage tank 23, the product is subsequently directly supplied to the paper machine.

When, at the beginning of the process, all of the reactants and the required amount of fresh water as well as the necessary amount of lye for initial the reaction have been charged into the reactor 3 and the pH has been adjusted to the value desired for the reaction, the reaction of the reactants starts in the reactor 3. The stirring device 10 is activated just as the circulation pump 11. For monitoring the reaction, at least one bypass circuit is activated by opening the respective valves to measure at least one of the following values: pH of the reaction mixture, current consumption of the circulation pump, turbidity measurement.

For the turbidity measurement, the valve 26 interposed in the bypass line 25 is opened, thus causing the circulation pump 11 to permanently circulate the reaction mixture via at least this circuit. Said circuit, moreover, comprises a turbidity meter 27 continuously measuring the turbidity of the reaction mixture. Valves 28 and 29 are provided to enable flushing of the turbidity meter with fresh water after completion of the reaction in order to safely and completely remove any deposits on the same prior to the next measurement.

Simultaneously with, or separately from, the turbidity measurement, a second bypass line 32 comprising at least two pH probes 33 and 34 can be activated by opening valves 30 and 31. Concerning the pH measuring circuit, it should be noted that the latter can be activated simultaneously with the turbidity measuring circuit or separately therefrom. For cleaning the pH probes are finally provided a separate cleaning circuit feeding an air supply 35 to the individual probes, and a flushing circuit 36 for the individual pH measuring probes as well as a drain 37. Said flushing circuit 36 is operated as follows: After completion of the reaction, valves 30 and 31 are closed such that the pH probes are separated from the remaining system. When cleaning the pH probes 33, 34, a valve 38 connected to the drain 37 is opened, and liquid is drained from the blocked part of the circulation line for measuring the pH value. Each pH probe comprises an associated flush valve for directly applying flush water from circuit 36 to the respective pH probe 33, 34. The flush water is sprayed under pressure onto the probes 33 and 34 to remove the deposits from the reaction on the pH probes. For efficient cleaning, a cycle is run in which at first a probe is sprayed with flush water, a valve connected to the air supply 35 and belonging to the probe in question is subsequently opened to drive flush water out of the line, and after this the second pH probe is treated in the same manner as the first one. Such a cycle is run several times, whereupon all of the valves are closed and the air is displaced from the line by the aid of flush water, and at least one of the valves 30, 31 is again opened to equalize the pressure within the line.

After such a flushing sequence, it is ensured that each pH probe is free of deposits already formed in the reaction of glyoxal with polyacrylamide and a pH probe without deposit will be available for the next reaction of the reactants so as to allow for an exact measurement of the pH value.

After having discharged the reaction product from the reactor 3, and prior to the beginning of a new cycle, the deposits formed during the reaction of water, glyoxal and polyacrylamide on the plant in pipes and also on the probes are removed as far as possible as described in order to avoid measuring errors and maintain the measuring accuracy of the plant. Deposits in the vessels and in the pipes do not constitute any problem for such a reaction, whereas deposits on the pH probes will result in a reduction of the measuring rate of the pH probes, and hence the measuring accuracy and, in particular, the response rate of the plant. A reduced response rate of the plant will no longer enable a timely and precise stop of the reaction, which might result in extended reaction times, and hence production losses and deteriorated products, which is why the above-described cleaning cycle for the pH probes is performed.

Figure 2:
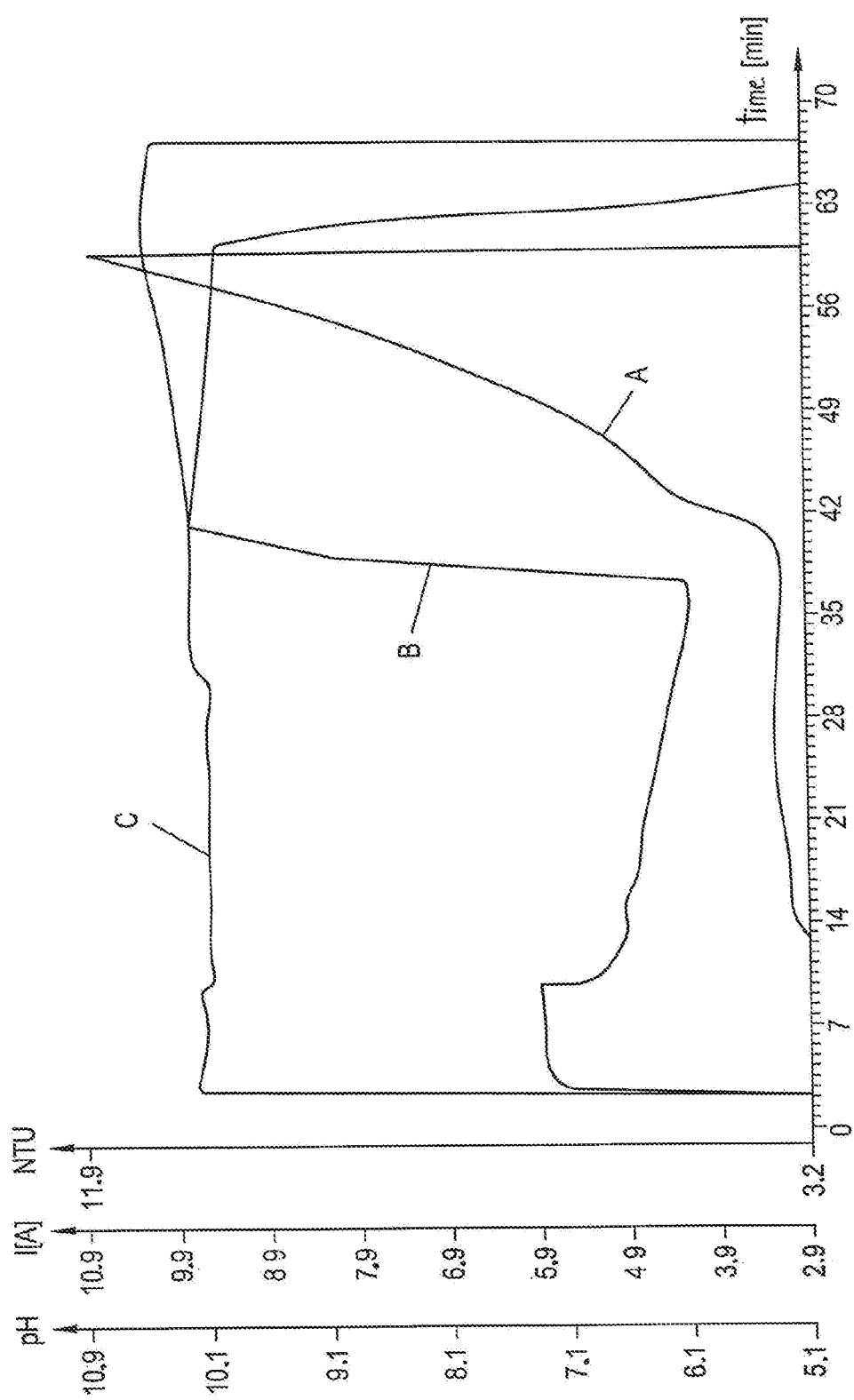
FIG. 2 is a plot showing the current consumption of the circulation pump, the pH and the change in turbidity during the reaction.

FIG. 2 is a plot tracing several factors measured during the reaction of glyoxal and polyacrylamide in an aqueous solution.

In the plot, the time is represented in minutes (min). In FIG. 2, curve A indicates the change in turbidity in the course of the reaction, curve B indicates the pH value measured during the reaction of glyoxal with polyacrylamide in an aqueous solution, and curve C depicts the current consumption of the circulation pump during the reaction. It is clearly apparent that curve A comprises a substantially constant turbidity value averaging 3.5 NTU until a time of about 40 min, that said turbidity value rises steeply to about 10.9 NTU from 40 min to a time of about 59 min, and then descends vertically. At 59 min, the reaction was stopped by the addition of acid as can be recognized on the likewise recorded curve B. Curve B shows that from a time of 37 min until a time of 40 min, a base was admixed to glyoxal and polyacrylamide, as is clearly apparent from the rise in the pH. Said pH slowly decreases in the period between 40 min and 59 min from an initial pH of about 9.6 to a value of about 9.3, before it drops massively, which indicates the beginning of the addition of acid to the reaction mixture, from which it can be concluded that the reaction time in the Example illustrated in FIG. 2 is about 19 minutes.

Similarly, it can be taken from graph C that the current consumption of the circulation pump at first remains substantially constant before it slowly starts to rise substantially linearly about 5 min after the end of the addition of the lye, and that the power consumption of the circulation pump again reaches a constant value from a power consumption of about 10.3 A. Said value was reached when the addition of acid was started, i.e. the reaction was stopped by the addition of acid so as to prevent any further reaction of glyoxal and polyacrylamide. From that moment, the current consumption value of the circulation pump was again constant. The overall output in this case ranges between 0.1 A and 1 A, in particular 0.2 A and 0.6 A.

As can be seen from these three curves A, B and C, all three curves are to be consulted for controlling or regulating the reaction, in particular where limit values are previously defined, such as, for instance, by how many NTU the turbidity is allowed to rise until the reaction is completed, by how many Amperes the current consumption of the circulation pump is allowed to rise until the reaction is completed, and by how many units the pH value is allowed to drop during the reaction of glyoxal and polyacrylamide, so as to allow for a conclusion about a complete reaction.

The method according to the invention will be explained in more detail by practical examples.

General Method Control

A precalculated amount of water is provided in a mixing tank. At the same time, or after the provision of the total amount of water, ethanedial and polyacrylamide are supplied to the tank and mixed by means of a stirring device and the circulation pump. By the addition of the base, the reaction is started at a pH above 8, whereupon the reaction and also its end are monitored by at least one of the following measurements:

a) turbidity measurement
b) pH adaptation as a function of the temperature
c) pH adaptation as a function of the reaction time
d) drop of the pH value
e) current consumption of the circulation pump, and
f) deviation of the turbidity from a trendline.

Example 1

Turbidity Measurement and pH Correction as a Function of Reaction Time

In the above-described reaction, the turbidity rises by 6 NTU during the reaction. The measurement of the reaction time of 18 min indicates that the latter deviates by 3 min from the predefined set value of 15 min. Therefore, a pH correction for the initial pH, which was 8.5, by 0.2 pH units is subsequently made in order to correct the reaction time towards the set reaction time for the next batch.

Example 2

Turbidity Measurement and Measurement of Current Consumption of Circulation Pump During the reaction, which was scheduled for 15 min, the turbidity rises by 6 NTU while, at the same time, the current consumption of the circulation pump increases from 0.2 A to 0.6 A, whereupon the reaction is immediately stopped by acid, since for both values the changes defined prior to the beginning of the reaction are reached within the predetermined time, the desired degree of conversion thus having been obtained.

Example 3

Control Via pH Drop and Turbidity Increase

During the reaction of glyoxal and polyacrylamide, the pH decreases by 0.3 units. After an increase in the turbidity by 5 NTU has been observed, the reaction is stopped with acid. In an analogous manner, control is possible via the pH drop and the current consumption of the circulation pump. After a pH drop by 0.3 units has been observed, the current consumption of the pump is in this case checked, and it is found that it has risen to 0.6 A from originally 0.2 A. Also in this case, the reaction is immediately stopped by the addition of acid, since for both values the changes defined prior to the beginning of the reaction are reached within the predetermined time.

Example 4

Control Via pH Drop at Defined Reaction Time

The reaction time of glyoxal and polyacrylamide is preadjusted at 15 min. The pH drop is measured, and it is found that the pH value has already dropped by 0.3 after 13 minutes, thus indicating a completion of the reaction. The reaction is stopped by the addition of acid. This approach is repeated a second time with the same result, whereupon a pH correction is made by lowering the latter by 0.2 units during the following approach, thus increasing the reaction time due to the lower basicity of the reaction.

Example 5 pH Correction at Defined Temperature

The initial temperature of the reaction is 25° C. The pH value for the beginning of the reaction is adapted to the actual conditions according to the following formula: pH basis at 20°+(temperature initial reaction−20° C.×0.05)=pH value. In the present case, the basis pH at 20° C. is 9, so that a pH of 9.25 results when applying this formula, said pH decreasing by 0.3 units in the course of the reaction such that the reaction can be stopped by the addition of acid at a pH of 8.95, being considered as complete.

The invention claimed is:

1. A method for preparing a glyoxylated polyacrylamide, in which an aqueous solution of polyacrylamide is supplemented with ethanedial (glyoxal) under stirring by means of a circulation pump, the reaction is started by the addition of a base at a basic pH value above 8, and is allowed to react under stirring and/or circulating, whereupon the reaction is stopped by the addition of an acid under stirring and/or circulating after completion of a predetermined reaction time, wherein the method is performed as a discontinuous method in which the quantitative reaction of ethanedial with an excess amount of polyacrylamide in an aqueous basic medium is controlled and/or regulated by:
    drop of the pH value;
    turbidity measurement, wherein when turbidity rises by a defined value during the reaction, any further reaction is prevented by adding an acid; and
    current consumption of the circulation pump.

2. The method according to claim 1, wherein polyacrylamide and ethanedial are used at a molar ratio of 3:1 to 10:1.

3. The method according to claim 1, wherein the reaction of polyacrylamide and ethanedial is stopped by an acid, by lowering the pH value of the reaction mixture to a value between 2 and 6.

4. The method according to claim 3, wherein the acidification is effected after the onset of a pH value drop of the reaction mixture by a value of at least 0.1 to about 1, and/or after an increase in the turbidity of the reaction mixture by 4 to 10 NTU.

5. The method according to claim 1, wherein based on a temperature of 25° C. of the reaction mixture, the pH value is lowered at an increasing temperature of the reaction mixture, and raised at a decreasing temperature, according to the formula pH start=basis pH+[(temp start−20° C.)·F], wherein basis pH constitutes a preselected value of above 8, pH start results from the reaction and constitutes an initial value for a next batch if the next batch is made, temp start represents the temperature at the onset/beginning of the reaction, and F is a multiplier between 0.03 and 0.08.

6. The method according to claim 5, wherein an increase or decrease of the pH value is performed according to a temperature correction factor of 0.05.

7. The method according to claim 5, wherein the reaction of polyacrylamide with ethanedial is performed over a predetermined constant time of between 2 and 30 minutes.

8. The method according to claim 1, wherein the lowering of the pH value of the reaction mixture is performed by the aid of an acid when reaching a constant current consumption of the circulation pump.

* * * * *